United States Patent
Chou

(10) Patent No.: US 8,014,183 B2
(45) Date of Patent: Sep. 6, 2011

(54) POWER CONVERTER WITH A FEEDBACK CONTROLLER

(76) Inventor: Chung Fu Chou, Tainan (TW)

( * ) Notice: Subject to any disclaimer, the term of this patent is extended or adjusted under 35 U.S.C. 154(b) by 173 days.

(21) Appl. No.: 12/036,212

(22) Filed: Feb. 22, 2008

(65) Prior Publication Data

US 2008/0309298 A1  Dec. 18, 2008

(30) Foreign Application Priority Data

Jun. 13, 2007 (TW) .............................. 96121264 A

(51) Int. Cl.
  *H02M 7/00*  (2006.01)
  *B23K 11/24*  (2006.01)
  *H02H 11/00*  (2006.01)

(52) U.S. Cl. .................. 363/123; 323/318; 307/326

(58) Field of Classification Search ............. 307/30; 323/207, 211, 293, 318; 363/13, 15, 123, 363/142, 143, 148, 144–147
See application file for complete search history.

(56) References Cited

U.S. PATENT DOCUMENTS

| | | | | |
|---|---|---|---|---|
| 5,157,319 A | * | 10/1992 | Klontz et al. | 320/108 |
| 5,715,156 A | * | 2/1998 | Yilmaz et al. | 363/142 |
| 5,734,254 A | * | 3/1998 | Stephens | 320/106 |
| 5,901,056 A | * | 5/1999 | Hung | 363/142 |
| 6,266,562 B1 | * | 7/2001 | Leyde | 607/5 |
| 6,790,206 B2 | * | 9/2004 | Panescu | 606/34 |
| 7,436,687 B2 | * | 10/2008 | Patel | 363/142 |
| 2002/0071290 A1 | * | 6/2002 | Youn et al. | 363/15 |
| 2003/0178977 A1 | * | 9/2003 | Wu | 323/282 |
| 2004/0164072 A1 | * | 8/2004 | Verhagen | 219/667 |

* cited by examiner

*Primary Examiner* — Adolf Berhane
*Assistant Examiner* — Jeffrey Gblende

(57) ABSTRACT

A power converter with a feedback controller includes a converter body with an input end for an input voltage, an output end for an output voltage, a controller with a feedback device, and a connector for connection with the output end of the converter body and with an electric appliance. The circuit of the converter body converts an input voltage to an output voltage. A controller is connected in circuit to the converter body and includes a circuit for regulating the voltage for a desired system output. The feedback device connects to the output end of the converter body. The output voltage is adjustable only when the controller receives an output voltage as a feedback from the feedback device. The controller is not triggered and hence an output voltage is not adjustable when the connector is engaged with the output end of the converter body.

5 Claims, 6 Drawing Sheets

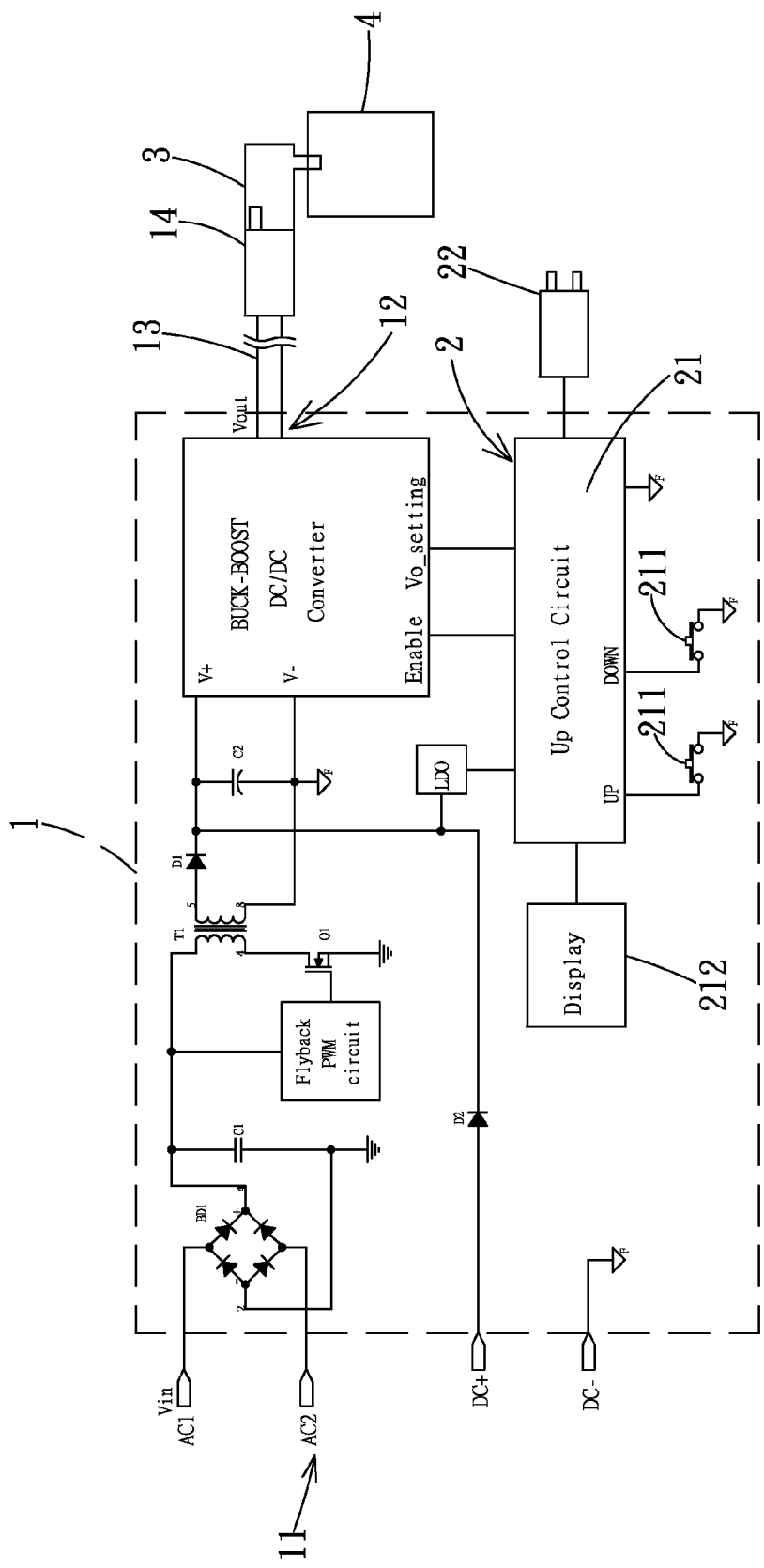
F I G . 2

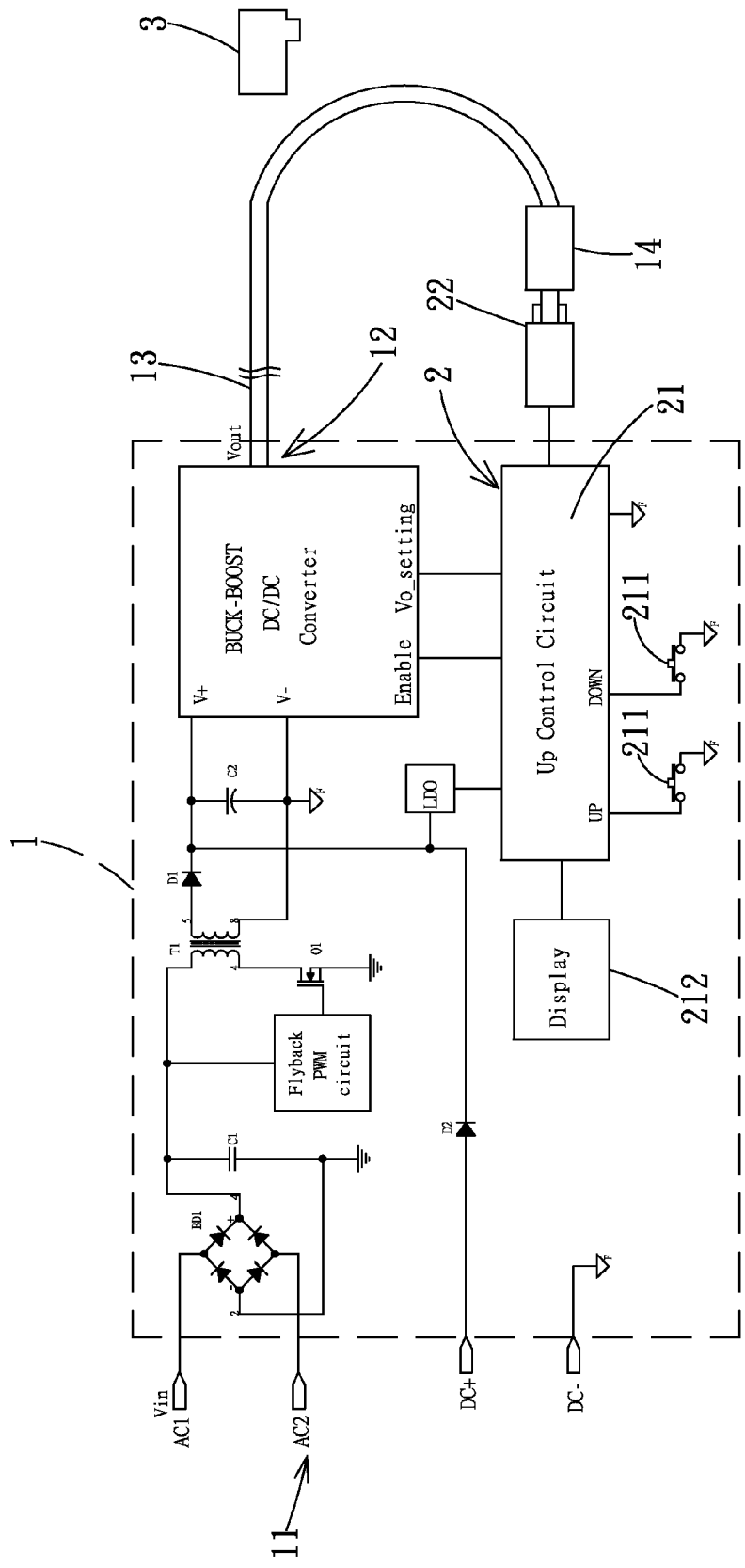
F I G . 3

POWER CONVERTER WITH A FEEDBACK CONTROLLER

BACKGROUND OF THE INVENTION

1. Field of the Invention

The present invention relates to a power converter and, more particularly, to a power converter with a controller that monitors and regulates variations in intended-to-be output voltages, sent as a feedback to the controller for output reliability.

2. Description of the Related Art

A power converter converts an input voltage to an output voltage to meet various demands of electric appliances. Power converters include AC to AC converters, AC to DC converters, DC to AC converters, and DC to DC converters. Power converters with a controller to regulate an output voltage for an input voltage are available in charging various electric appliances, including computers, cell phones, MP3, etc requiring different input voltages.

A conventional output-adjustable power converter includes a converter body with a circuit to regulate the input voltage for a desired output voltage. FIG. 5 shows a switching power converter including a converter body 1' having a circuit (not shown in FIG. 5) for manipulating on an input voltage Vin for a desired output voltage value Vout. The converter body 1' is connected at the same time with four resistors of different resistances, $R_{1'}$, $R_{2'}$, $R_{3'}$, and $R_{4'}$, the connection of which with the converter body is controlled by a selective-switching controller 11'. The output voltage Vout can thus be adjusted depending on different reference voltages due to the specifically selected connection of the resistors ($R_{1'}$, $R_{2'}$, $R_{3'}$, and $R_{4'}$) by the selective-switching controller 11'.

Although the above conventional power converter in FIG. 5 has the merit of simplicity in structure, in operation the selective-switching controller 11' may nevertheless inadvertently jump to an undesired connection with any of the resistors and effects adversely the output. Furthermore, the output voltage Vout can potentially be adjusted even when an electric appliance is being powered by the output voltage Vout of the converter, leading to safety issues and damage to the electric appliance being used.

FIG. 6 shows a second conventional power converter with a converter body 2' and a plurality of external resistors $R_{5'}$ to $R_{5N'}$ of different resistances, the connection of which with the converter body 2' is selectively made depending upon desired output voltage Vout.

Even though the power converter in FIG. 6 has the advantage of a simple structure and a low manufacturing cost, it also has the same disadvantage stated before: during the time an electric appliance is being powered by the output voltage Vout of the converter, the potentially adjustable output voltage may cause safety issues and damage to the electric appliance being charged. Furthermore, external resistors are not conveniently portable, and such a power converter is inoperable in absence of external resistors.

FIG. 7 shows a third conventional power converter having a converter body 3' and a plurality of output connectors 4' to 4N'. The converter body 3' includes a multiple-conductor cable 31' at an output end thereof. Each output connector of 4' to 4N' includes a resistor of 41' to 4N1' of different resistances, as well as a connector 42' to 4N2' for connection with electric appliances. One of the connectors of 42' to 4N2' is selected to connect to the multiple-conductor cable 31' for regulating the output voltage Vout for a desired value.

Such a power converter illustrated in FIG. 7 assures more usage safety since no output voltage Vout is directed to the electric appliance being powered. However, multiple output connectors 4'-4N' are not handy for users.

FIG. 8 shows a fourth conventional power converter of the type controlled by a micro computer. The power converter includes a converter body 5' connected to a controller 51' for adjusting output voltage Vout via a control button 511'. Such a power converter is handy without burdensome external components, and also allows output of various voltages through easy operation of a button. However, the button 511' can be inadvertently activated by an unintentional contact.

BRIEF SUMMARY OF THE INVENTION

An objective of the present invention is to provide an output-adjustable power converter that regulates an output voltage for a desired value.

A power converter according to the preferred teachings of the present invention includes a converter body, a controller, and a connector. The converter body has an input end for an input voltage and an output end for an output voltage. The output end of the converter body connects to a wire and a power plug for output voltage. The converter body further includes a converter circuit for converting an input voltage to an output voltage. A controller connects to the converter circuit (of the converter body) either externally (outside of the converter body) or internally (inside of the converter body). The controller includes a controller circuit for regulating the output voltage from the converter body, an operating interface with a press button and a monitor, and a feedback device with a power outlet connected to the output plug of the converter body. The output voltage of the converter body is regulated by the controller when the press button (of the controller) is activated, which occurs only when the power outlet (of the feedback device of the controller) connects with the output plug (of the converter body) and hence receives the output voltage sent as a feedback from the feedback device (of the controller). Without a valid connection between the power outlet of the feedback device and the output plug (at the output end of the converter body), the act of pressing the button alone will not activate the controller to perform the regulating function on the output voltage (sent as a feedback from the feedback device) for a desired output voltage Vout.

The connector is designed for connection with the output plug (at the output end of the converter body) and also for connection with an electric appliance for an output voltage Vout from the converter body being an input voltage to an electric appliance (via intermediate devices of the output plug and the power outlet).

And yet when regulating an output voltage Vout, the output plug (at the output end of the converter body) will be disengaged from the connector and connects to the power outlet of the feedback device for the controller to receive the output voltage Vout (sent as a feedback from the feedback device). At this moment, the press button of the operating interface (of the controller) can be activated for regulation of the output voltage Vout while the controller is, at the same time, monitoring the output voltage Vout for its accuracy. The monitoring function of the controller can be added as a supplementary function in addition to the main function of regulation of voltage. In the most preferred form, the circuit of the controller monitors the output voltage (sent as a feedback from the feedback device) for more precise regulation of the output voltage.

The present invention will become clearer in light of the following detailed description of an illustrative embodiment of this invention described in connection with the drawings.

BRIEF DESCRIPTION OF THE DRAWINGS

The illustrative embodiment may best be described by reference to the accompanying drawings where:

FIG. 2 shows a schematic diagram of the power converter of FIG. 1 with the power converter in a state supplying power to an electric appliance.

FIG. 3 shows a schematic diagram of the power converter of FIG. 1 with the power converter in a state of regulating output voltage.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
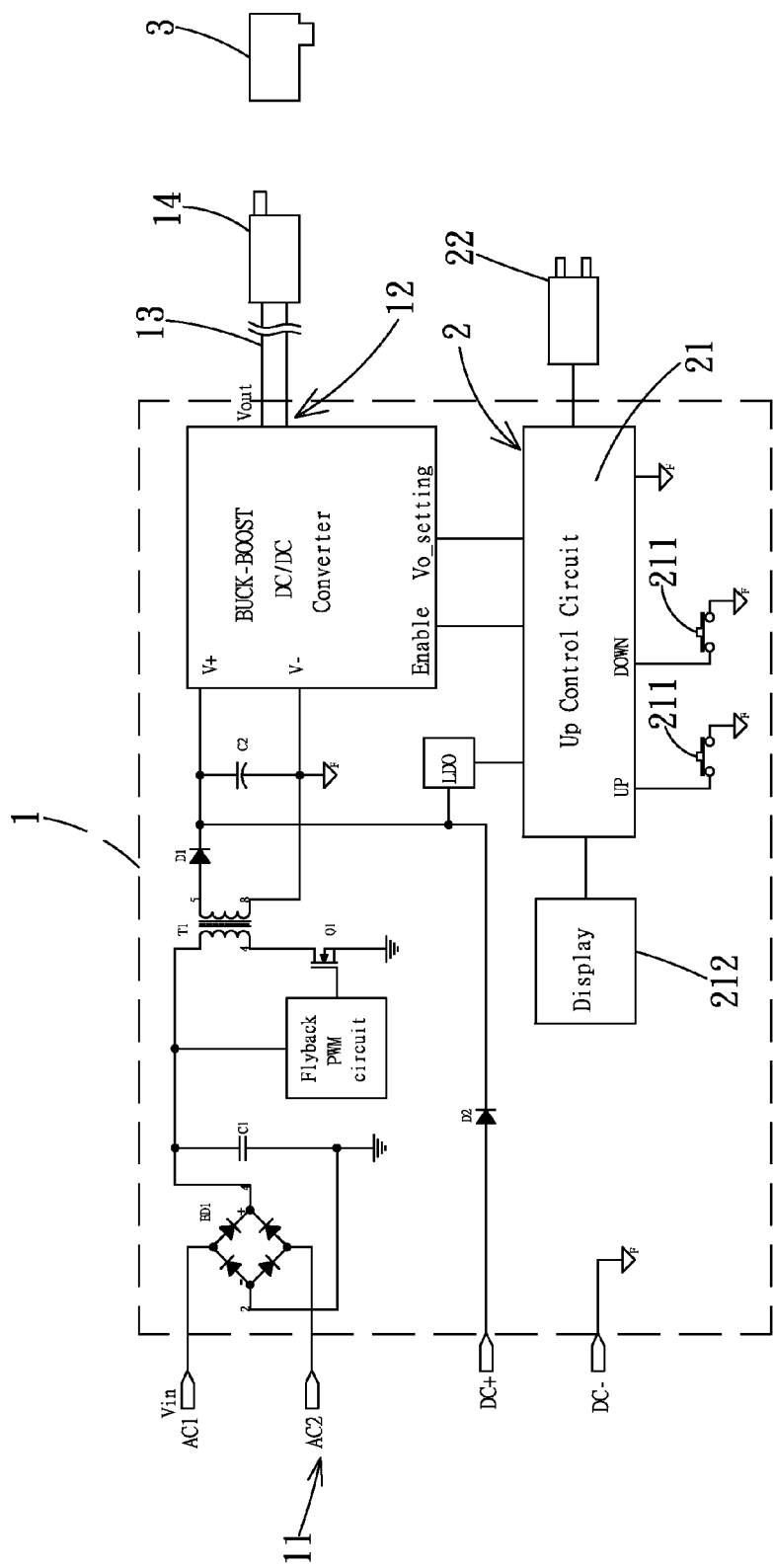
FIG. 1 shows a schematic diagram of an output-adjustable power converter of a first embodiment according to the preferred teachings of the present invention.

A power converter of a first embodiment according to the preferred teachings of the present invention is shown in FIG. 1 to 3. According to the preferred form shown, the power converter includes a converter body 1, a controller 2, and a connector 3. The converter body 1 includes an input end 11 for an input voltage Vin and an output end 12 for an output voltage Vout. The output end 12 connects to a plug 14 via a wire 13. The converter body 1 includes a circuit (not shown in figures) for converting an input voltage Vin to an output voltage Vout.

The controller 2 connects internally (within of the converter) in circuit to the converter body 1. The controller 2 includes a circuit (not shown) for regulating and monitoring the output voltage Vout from the converter body 1. Furthermore, the controller 2 includes an operating interface 21 with a press button 211 and a display 22 for a user to issue a command via the press button 211 for a desired output voltage value. The controller 2 further includes a feedback device 22 with a power outlet for the plug 14 (of the output end 12 of the converter body 1). For the converter to adequately operate and to output a desired output voltage Vout, the power outlet of the feedback device 22 is connected to the plug 14 (of the output end 12 of the converter body 1) to receive the output voltage sent as a feedback from the feedback device 22. To be more specific, without a valid connection between the power outlet of the feedback device 22 and the plug 14 (of the output end 12 of the converter body 1), the single action of pressing the button 211 alone will not activate the controller 2 to regulate the output voltage Vout.

The connector 3 is used for connection with the plug 14 (of the output end 12 of the converter body 1) and with an electric appliance 4 (shown, for instance, in FIG. 2).

With reference to FIG. 2, when in use, the plug 14 (of the output end 12 of the converter body 1) connects with the connector 3; when the connector 3 connects with an electric appliance 4, an output voltage Vout is conveyed from the converter body 1 to the electric appliance 4. At this moment, since there is no connection between the power outlet of the feedback device 22 and the plug 14 (of the output end 12 of the converter body 1), and hence no output voltage sent from the feedback device 22, even if a user inadvertently hits the press button 211, the output voltage Vout will remain intact, assuring safety in usage and also avoiding damage to the electric appliance 4.

With reference to FIG. 3, when it is decided to be time to regulate an output voltage Vout, the plug 14 is disengaged from the connector 3 and connects to the power outlet of the feedback device 22 for the controller 2 to receive the output voltage Vout (sent as a feedback from the feedback device 22). At this moment, the press button 211 of the interface 21 can be triggered by being pressed for regulation of the output voltage Vout while the controller is monitoring the output voltage. The connector 3 in the current invention operates without the help of internal resistors, and hence is less burdensome and more conveniently portable.

The monitoring function of the invention needs not to be present in all embodiments of the invention but can serve as an optional supplementary function of the controller. In the case that the circuit of the controller 2 is not in charge of monitoring the output voltage (sent as a feedback from the feedback device), the output voltage can still be regulated for a desired value, which occurs, as stated before, only when the plug is disengaged from the connector and connects to the power outlet of the feedback device, avoiding damage to the electric appliance.

Figure 4:
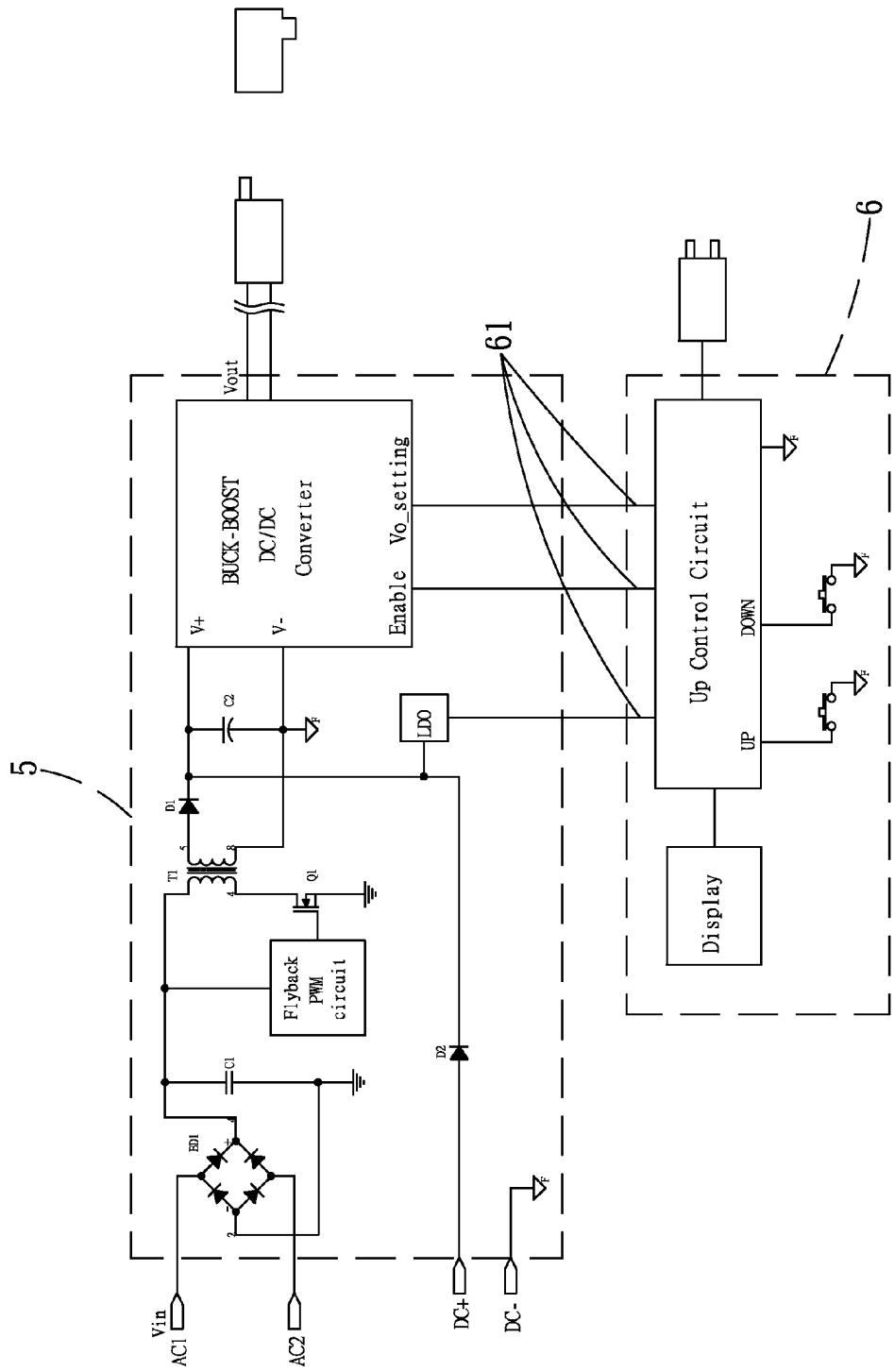
FIG. 4 shows a schematic diagram of an output-adjustable power converter of a second embodiment according to the preferred teachings of the present invention.
Figure 5:
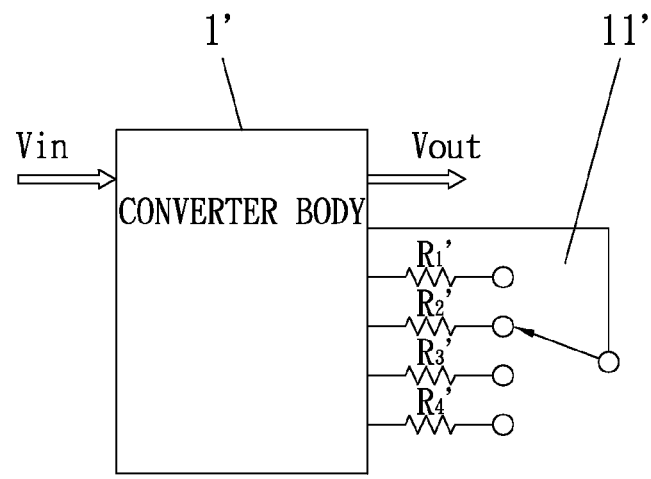
FIG. 5 shows a schematic diagram of a first conventional output-adjustable power converter.
Figure 6:
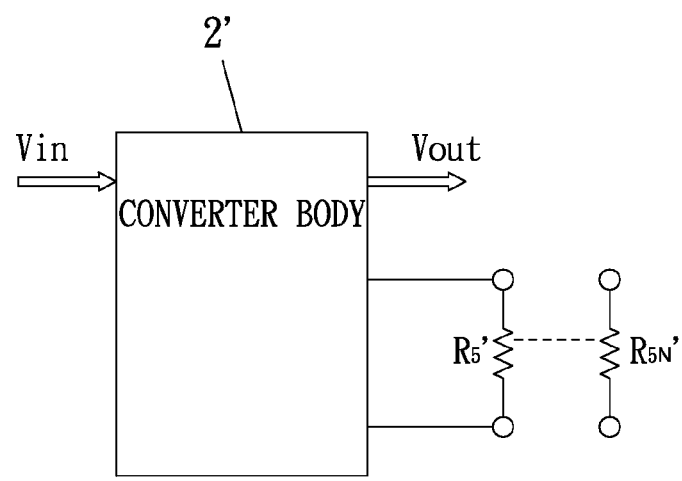
FIG. 6 shows a schematic diagram of a second conventional output-adjustable power converter.
Figure 7:
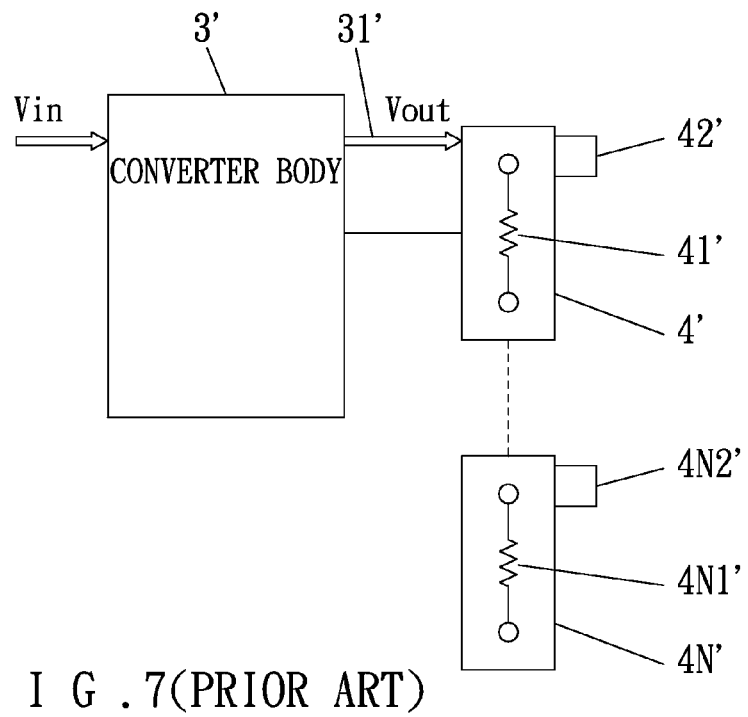
FIG. 7 shows a schematic diagram of a third conventional output-adjustable power converter.
Figure 8:
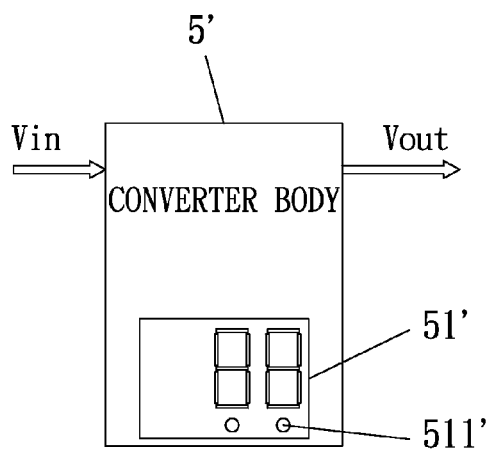
FIG. 8 shows a schematic diagram of a fourth conventional output-adjustable power converter.

FIG. 4 shows a second embodiment of a power converter with a feedback controller based on the teachings of the present invention. The difference between the first and the second embodiment lies in that the controller 6 in the second embodiment is located outside the converter body 5 and connects to the converter body 5 via an external converter-controller connecting wire 61. Operation and advantages of the power converter of the second embodiment are substantially the same as those of the first embodiment.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. A power converter with a manually initiated feedback controller of a dual-locking interface, comprising:
 a converter body, including
  an input end for an input voltage,
  an output end for an output voltage, and
  a converting circuit to convert said input voltage to said output voltage;
 a controller electrically connected to said converter body and activated when said controller receives said output voltage from said converter body, including
  a circuit to regulate said output voltage, and
  a feedback device, connected to said output end of said converter body,
  an operating interface, including a display and a plurality of press buttons; and a connector for connection with said output end of said converter body and for connection with an electric appliance, wherein said controller is not activated when said connector is engaged with said output end of said converter body, and said controller is activated when said output end is engaged with said feedback device while being disengaged from said connector, and at the same time said press buttons of said operating interface are turned on.

2. The power converter with a feedback controller as claimed in claim 1, wherein said controller regulates said output voltage received and later sent back as a feedback by said feedback device.

3. The power converter with a feedback controller as claimed in claim 1, with said output end of said converter body includes a wire and a plug, and said feedback device includes a power outlet, wherein said plug engages said power outlet to activate said controller.

4. The power converter with a feedback controller as claimed in claim 1, with said controller housed within said converter body.

5. The power converter with a feedback controller as claimed in claim 1, with said controller being located outside said converter body and connected electrically to said converter body.

* * * * *